(12) United States Patent
Fink et al.

(10) Patent No.: US 8,511,954 B2
(45) Date of Patent: Aug. 20, 2013

(54) FASTENING ASSEMBLY

(75) Inventors: Andreas Fink, Eningen (DE); Wolfgang Woernle, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 1234 days.

(21) Appl. No.: 10/524,811

(22) PCT Filed: Feb. 24, 2003

(86) PCT No.: PCT/DE03/00564
§ 371 (c)(1),
(2), (4) Date: Aug. 10, 2005

(87) PCT Pub. No.: WO2004/020844
PCT Pub. Date: Mar. 11, 2004

(65) Prior Publication Data
US 2006/0024146 A1  Feb. 2, 2006

(30) Foreign Application Priority Data

Aug. 22, 2002 (DE) .................................. 102 38 528

(51) Int. Cl.
*F16B 37/00* (2006.01)
(52) U.S. Cl.
USPC ........................................ 411/104; 280/728.2
(58) Field of Classification Search
USPC ............... 280/728.2, 735; 403/200; 411/104
See application file for complete search history.

(56) References Cited

U.S. PATENT DOCUMENTS

| 367,196 | A | * | 7/1887 | Deblieux | 411/186 |
|---|---|---|---|---|---|
| 3,208,328 | A | | 9/1965 | Myers | |
| 5,730,465 | A | * | 3/1998 | Barton et al. | 280/775 |
| 5,873,597 | A | * | 2/1999 | Sim | 280/735 |
| 6,213,495 | B1 | * | 4/2001 | Plankl et al. | 280/728.2 |
| 6,234,708 | B1 | * | 5/2001 | Beck et al. | 403/353 |
| 6,286,858 | B1 | * | 9/2001 | Shepherd et al. | 280/728.2 |
| 6,309,132 | B1 | * | 10/2001 | Jakob et al. | 403/200 |
| 6,631,570 | B1 | * | 10/2003 | Walker | 36/100 |
| 6,705,635 | B2 | * | 3/2004 | Hoeft et al. | 280/728.2 |

FOREIGN PATENT DOCUMENTS

| EP | 0 747 604 | 12/1996 |
|---|---|---|
| EP | 0 898 087 | 2/1999 |
| FR | 2 613 001 | 9/1988 |

OTHER PUBLICATIONS

Definition of "Opposite" provided by wordnet.princeton.edu/perl/webwn and doenloaded from http://www.google.com/search?hl=en&lr=&as_qdr=all&defl=en&q=define:opposite &sa=X &oi=glossary_definition&ct=title, 1 page, undated.*

* cited by examiner

*Primary Examiner* — Gary Estremsky
(74) *Attorney, Agent, or Firm* — Kenyon & Kenyon LLP

(57) ABSTRACT

A fastening assembly using the keyhole principle is provided. For this purpose, a first component having a bolt that has a round and smooth head is guided through the larger opening of the keyhole, in order then with the head to engage behind the smaller opening of the keyhole-like cut-out for fastening. At the end of its shank, the bolt preferably features an external toothing or an external polyhedron as engagement surface for a tool for fastening the first component to the second component.

10 Claims, 3 Drawing Sheets

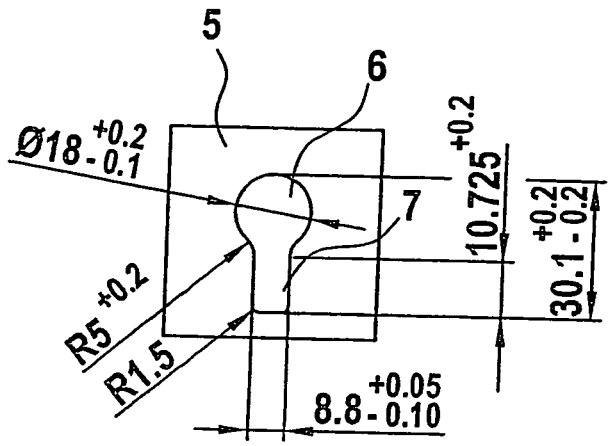
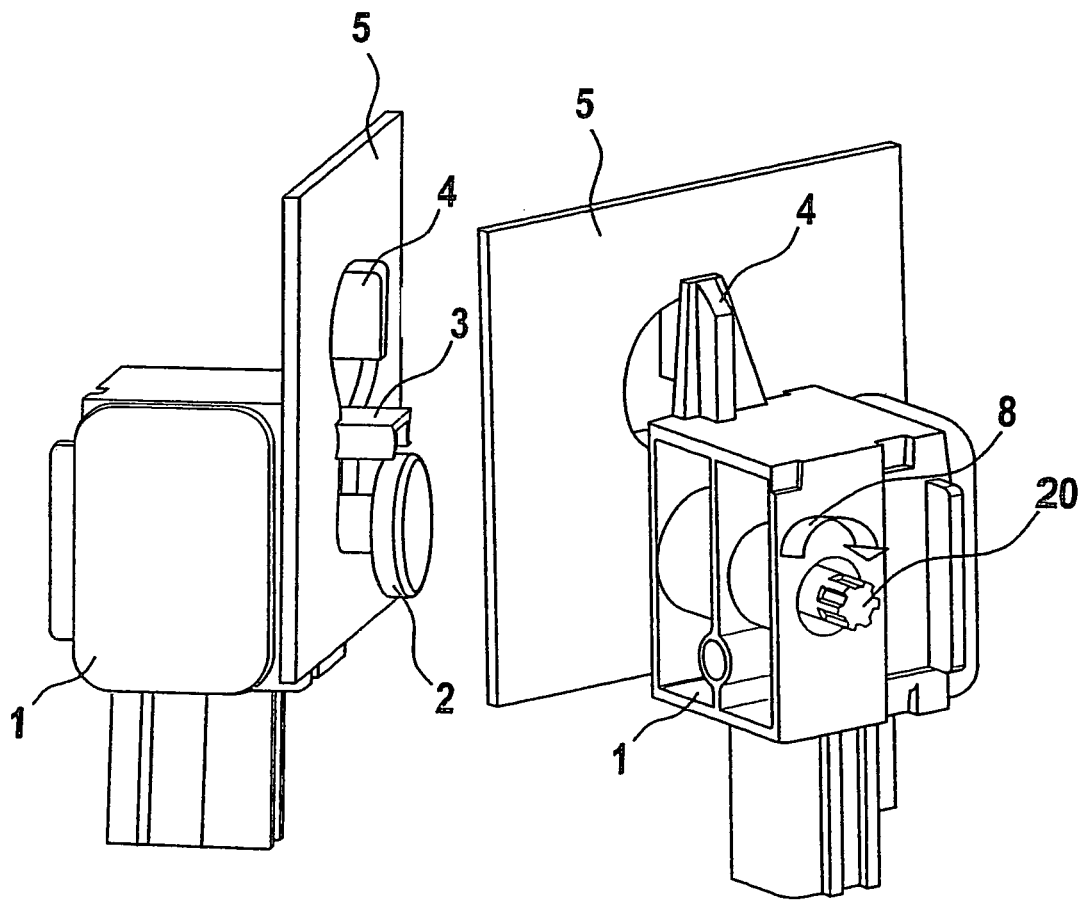

FASTENING ASSEMBLY

FIELD OF THE INVENTION

The present invention relates to a fastening assembly.

BACKGROUND INFORMATION

European Patent No. EP 898 087 B1 describes a fastening assembly according to a keyhole principle, in which a bolt used for fastening has engagement surfaces for a tool at both ends. This unusual bolt makes it possible to clamp the fastening assembly from both ends.

The disadvantage of the design approach presented in EP 898 087 B1 is that this unusual bolt is necessary for fastening.

An object of the present invention, therefore, is to provide a fastening assembly that avoids this bolt.

SUMMARY

An example fastening assembly according to the present invention may have the advantage that now the bolt has a round head having a smooth surface and that hence a simpler bolt or an alternative fastening assembly is possible. This bolt is in particular more advantageous to manufacture, since on the one hand the engagement surface for the tool is eliminated, thus requiring fewer work steps for manufacturing the bolt, and also because the head can now be designed to be thinner than would be necessary in the case of a head that has an engagement surface. This saves material and hence also costs. The preassembly process of screwing in this bolt having only one engagement surface is neutral as regards costs compared to the bolt having two engagement surfaces, so that thereby the cost advantage gained by the simpler bolt is not reduced.

One embodiment may be especially advantageous in that the engagement surface at the end of the bolt takes the form of a specific external toothing, for example TORX, or of an external polyhedron, as in an Allen bolt, for example. TORX denotes a star-shaped toothing. Allen is a common name for a hexagon. Alternatively, it is also possible to use an internal toothed socket or an internal polyhedron. These designs allow for a precise screw-in operation. In this context the use of a left-hand thread is particularly advantageous. This is advantageous, since clockwise rotating tools are normally used in the automotive industry. The screw-on process occurs on the side of the external toothing or the external polyhedron, so that in this case a screw-on process is effected by a clockwise rotation of the tool. Furthermore, the bolt is advantageously designed to be self-locking. This is to hold the bolt in place following preassembly. The bolthead then has the specified clearance with respect to the housing, which allows for the hooking into the keyhole. In the subsequent screw-on process, self-locking is overcome and the bolt is tightened as far as the end stop. Self-locking may be implemented, for example, by a coating over a subsection or over the entire length of the thread.

Furthermore, it is advantageous if the fastening assembly according to the present invention has a rotation guard as well as a translation guard. On the one hand, this facilitates the installation of the fastening assembly according to the present invention, while on the other hand securing the first component fastened to the second component against rotational or translational movements, so that the first component, for example the sensor housing, always remains in the correct position in the keyhole. This may be achieved by projections, which, once the components have been assembled through the keyhole, block rotational and translational movements. The projections are provided in the housing in such a way that they extend with a precise fit into the keyhole and thereby prevent a movement. It is also possible to design the projections in such a way that the first component has just a small amount of play. This is advantageous particularly also during the fastening process so as to simplify this work step.

BRIEF DESCRIPTION OF THE DRAWINGS

Exemplary embodiments of the present invention are shown in the figures and are explained in greater detail in the following description.

FIG. 3 shows the second component of the example fastening assembly according to the present invention in a top view.

FIG. 4 shows a side and rear view of the example fastening assembly according to the present invention.

DETAILED DESCRIPTION OF EXAMPLE EMBODIMENTS

Figure 1:
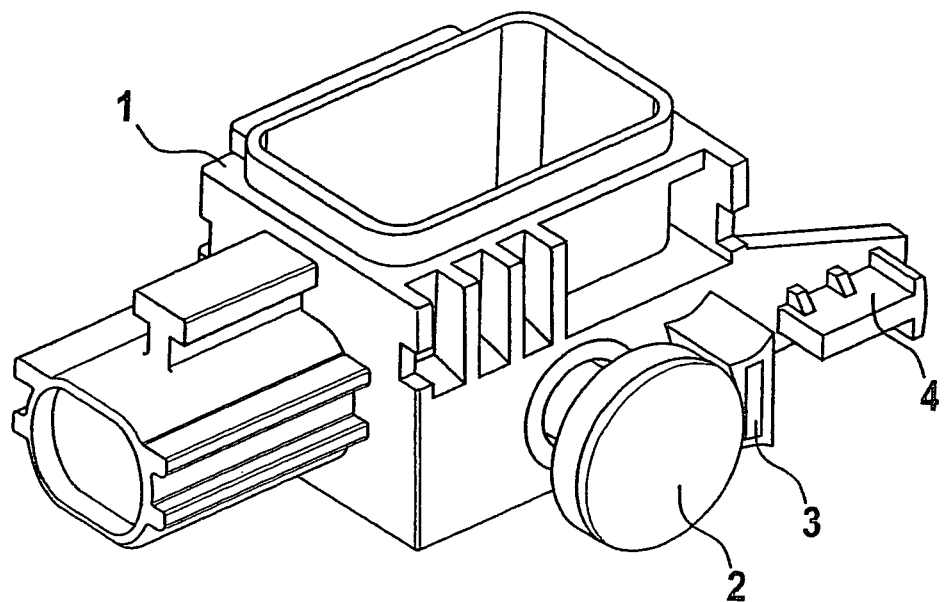
FIG. 1 shows a first component of an example fastening assembly according to the present invention including a bolt.

In the automotive industry, components, particularly sensors, for restraining systems for example, are fastened to the vehicle in various ways. Apart from screwing the component to a nut welded into the vehicle body or screwing the component via a hole in the vehicle body into a threaded bushing of the component using a bolt, the keyhole principle is increasingly used for fastening housings. For this purpose, bolts, preassembled and held in place by self-locking in a housing of the component to be mounted, are guided head first into the larger part of a keyhole-like cut-out in the vehicle body and are then hooked into the lower, narrower part, i.e. a further opening of the keyhole. The bolt is then tightened and the component thereby clamped.

In contrast to the two other methods mentioned above, the keyhole principle has the advantage that on the one hand no nut needs to be welded into or otherwise preinstalled in the vehicle, which represents a significant cost advantage. On the other hand, as in the case where a bolt is screwed through according to the keyhole principle, it is not necessary to have access from both sides of the screw-on point. This makes it possible, for example, to hook and screw a sensor onto a hollow B column, which is no longer accessible from the outside, thus making the choice of the screw-on location more flexible.

According to an example embodiment of the present invention, a fastening assembly is now provided, which has a bolt, the head of which is round and has a smooth surface. At the end of its shank, this bolt has engagement surfaces for a tool, preferably an external toothing or an external polyhedron. The bolt has a round head of variable thickness, which does not have an engagement surface for a tool. This is followed by the shank, the end of which has an engagement surface for a tool. The bolt shank itself has, over a subsection or its entire length, a thread for screwing it into a matched bushing of the housing of the component that is to be screwed on. Preferably, a left-hand thread is used for this purpose, since in the automotive industry clockwise rotating tools are normally used.

The screw-on process occurs on the side of the external toothing or the external polyhedron, so that in this case a screw-on process is effected by a clockwise rotation of the tool. Furthermore, the bolt is designed to be self-locking. This is to hold the bolt in place following preassembly. The bolthead then has the specified clearance with respect to the housing, which allows for the hooking into the keyhole. In the subsequent screw-on process, the self-locking is overcome and the bolt is tightened as far as the end stop. Self-locking may be implemented, for example, by a coating over a subsection or over the entire length of the thread. The coating is a so-called jamming coating as is described for example in DIN 267 part 28. The coating is made of synthetic material, which causes a jamming action in the course of the screw-in process. The jamming coatings can be implemented as all-around coatings, striated coatings or spot coatings. They cannot stop the unscrewing of the connection, but they prevent a complete detachment. As material for the coating, polyamide, GESIP7, Clemm-LOC, VC3-Vibratite or similar substances may be used.

FIG. 1 shows the view of a part of the fastening assembly according to the present invention. Here a housing 1 of a sensor, in this case of a side-impact sensor, is represented as the first component, from which a head 2 of a bolt protrudes, above which a rotation guard 3 is located, the housing additionally featuring a translation guard 4. The rotation guard and the translation guard are designed as appropriately formed projections, which in a fastened state prevent housing 1 from turning or shifting.

Housing 1 has spaces for receiving the electronic equipment, ribbing for reinforcement and for mechanical identification in the production line, translation guard 4 having the form of a flange, which will press against an edge of a cut-out of the keyhole so as to prevent a translation movement. This flange 4 presses against the opposite end of the cut-out as compared to the bolt, which engages behind the smaller opening of the keyhole with head 2. That is to say, flange 4 presses against the edge of the larger opening through which head 2 is insertable. Here flange 4 has a rounded surface, which will press against the edge of the cut-out. Rotation guard 3 is shaped in such a way that it wedges at the interface between the large and the small opening of the keyhole so as to prevent a rotation of housing 1 when housing 1 has been inserted into the keyhole and clamped. Housing 1 has been manufactured for example from metal and/or plastic. As shown here, head 2 of the bolt is round and has a smooth surface. Merely the bolting direction and a marking may be applied on head 2.

Figure 2:
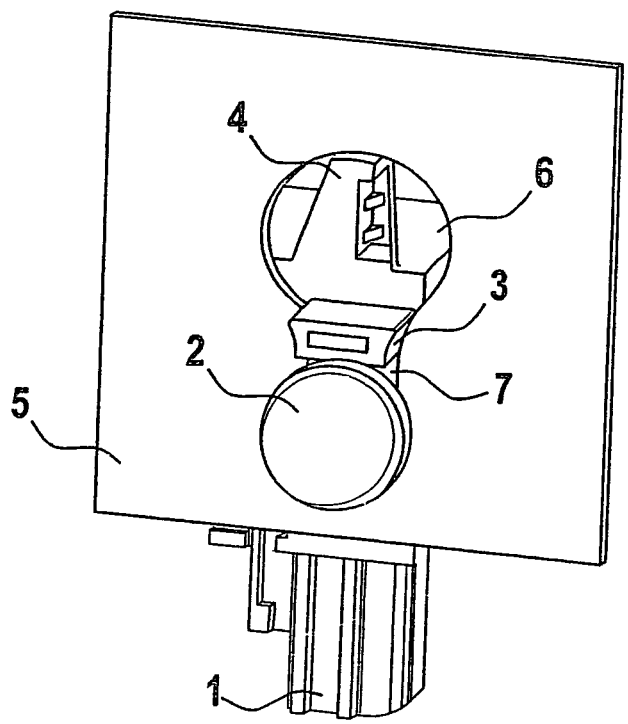
FIG. 2 shows the example fastening assembly in an assembled state.

FIG. 2 now shows housing 1 as it has been fastened in a keyhole, which is produced as a cut-out in a panel 5. The keyhole features a larger opening 6, through which head 2 may be guided. For fastening, housing 1 is then guided with head 2 downward so as to insert head 2 into the smaller opening 7 since head 2 due to its size engages behind this smaller opening 7, thereby allowing for clamping by tightening the bolt. Openings 6 and 7 thus merge into each other and are not separated from each other.

Here it is also shown how rotation guard 3 reaches the clamping at the interface between large opening 6 and small opening 7 and how translation guard 4 presses against the edge, namely exactly in the opposite direction to bolt 2, in order to prevent translational movements in the longitudinal direction of the keyhole.

In a top view, FIG. 3 shows panel 5, which may be part of a body shell, with the keyhole, that is, with large opening 6 and small opening 7. Typical dimensions are indicated here by way of example. Upper opening 6 has generally a circular shape, while lower opening 7 takes the form of a rectangular cut-out. Alternatively, it is also possible for openings 6 and 7 to be formed hexagonally or elliptically.

The width of rectangular cut-out 7 is such that the bolthead can engage behind this opening. The diameter of larger opening 6, however, is dimensioned in such a way that head 2 may be guided through it. This then allows for a simple installation of housing 1, for example a sensor housing, during assembly at an automobile manufacturer.

FIG. 4 shows the side view and a rear view of fastened housing 1. In the side view, housing 1 is fitted with a cover and is bolted by bolt 2 to panel 5 having the keyhole opening. Additionally, translation guard 4 and rotation guard 3 are shown protruding through the keyhole. In the rear view, an external TORX 20 is shown as an engagement surface for a tool to tighten the bolt from behind in such a way that it brings about a clamping against panel 5. Shown here as well is a rear view of translation guard 4, which is reinforced by ribbing. The direction of rotation of external TORX 20 here indicates a clockwise rotation. This rotation is indicated by reference numeral 8. Instead of the external TORX, it is also possible to choose other external toothing or external polyhedron forms.

Figure 5:
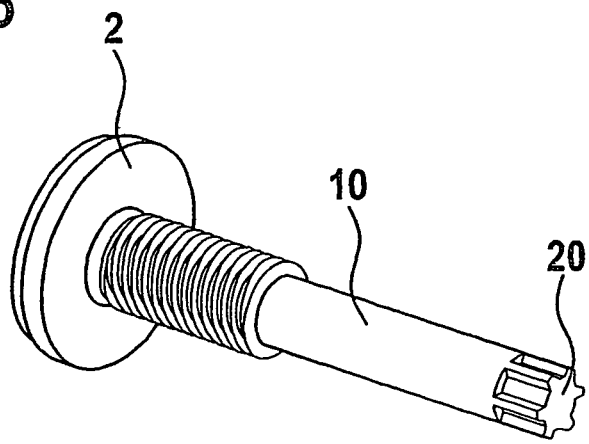
FIG. 5 shows a view of the bolt of the example fastening assembly according to the present invention.

FIG. 5 shows a representation of the bolt belonging to the fastening assembly according to the present invention. The bolt features external TORX 20 and round head 2. In addition, the bolt has a bolt shank 10 featuring a thread in a specified area. The thread may span the entire bolt shank 10. Here the area that is represented as somewhat thinner is free of a thread. This has the advantage that in the preassembly of the bolt only a short section of thread has to be screwed into the bushing. The smooth part of the shank can simply be guided through the bushing. This saves screw-in time and hence costs.

Figure 6:
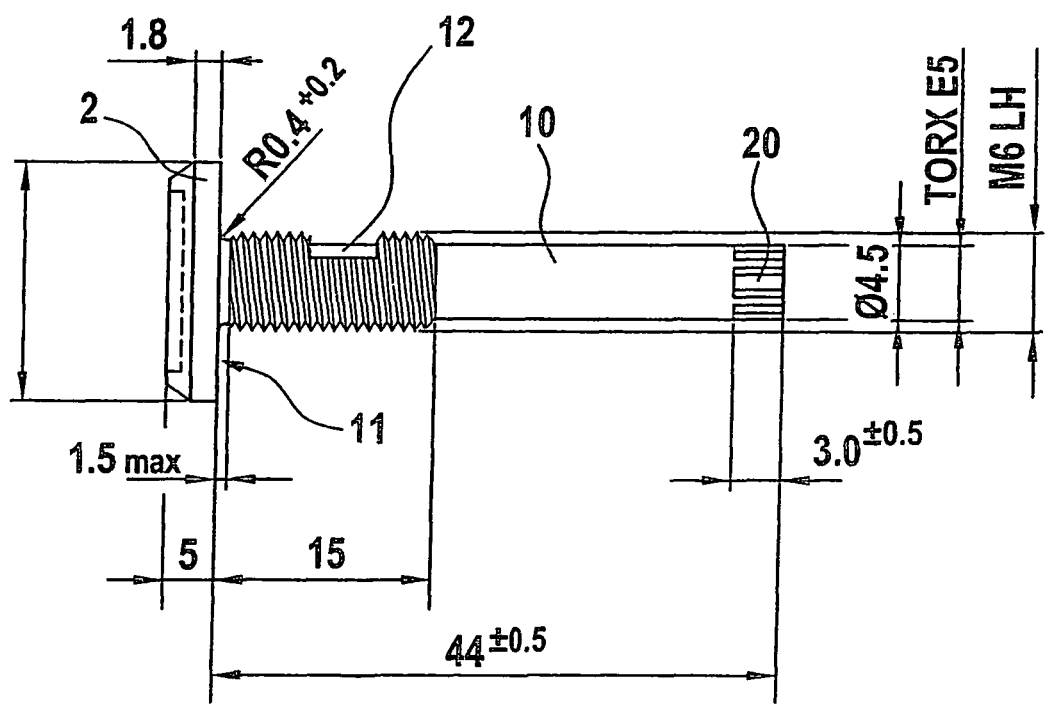
FIG. 6 shows a side view of the bolt as an engineering drawing.

FIG. 6 again shows the bolt in a side view. External TORX 20 and the thread are shown here and are marked with typical dimensions. Additionally, thread area 12 features an area for a jamming coating for securing the position of the bolt. Polyamide may be advantageously used for this purpose.

Furthermore, it is possible to provide a star-shaped toothing at head 2, which represents an additional guard against a loosening of the bolt after the bolt has been tightened as far as the end stop during assembly at the screw-on location.

The fastening assembly according to the present invention is now fastened in that first the bolt having head 2 is screwed into housing 1 in such a way that head 2 still protrudes a fair bit. Head 2 is then guided through large opening 6 of the keyhole and device 1 with head 2 is moved in a translatory manner in such a way that head 2 engages behind opening 7. Via the external toothing or external polyhedron 20, housing 1 may then be fastened to panel 5. As shown above, in thread area 12, the bolt features self-locking based on a coating, which is overcome by screwing the bolt onto panel 5. Self-locking may also be implemented through the use of a thread-forming bolt.

What is claimed is:

1. A fastening assembly, comprising:
   a first component having a threaded bushing, wherein the first component includes a translation guard configured to prevent a translator movement of the first component when being fastened, and wherein the first component includes a rotation guard configured to prevent a rotational movement of the first component relative to the second component when being fastened;
   a second component having a single keyhole shaped cut-out including a larger opening and a smaller opening, wherein the translation guard and the rotation guard are appropriately formed projections and the translation guard presses against an edge of the single keyhole shaped cut-out and the rotation guard wedges at the connection portion between the larger opening and the smaller opening of the single keyhole shaped cut-out; and a self-locking bolt configured to be screwed into the threaded bushing so that the bolt can be guided with the head through the larger opening of the single keyhole shaped cut-out and the head engages behind the smaller opening of the single keyhole shaped cut-out for fastening, the bolt having engagement surfaces for a tool at an end of the shank, wherein the head has a bottom surface connecting the head to the shank and a top surface that is round and smooth.

2. The fastening assembly as recited in claim 1, wherein the engagement surfaces have a form of one of an external toothing or an external polyhedron.

3. The fastening assembly as recited in claim 1, wherein the shank of the bolt has a left-hand thread.

4. The fastening assembly as recited in claim 1, wherein the bolt has a coated thread, the self-locking being achieved via the coating.

5. The fastening assembly as recited in claim 1, wherein the bolt has a thread configured to be thread-forming for a corresponding bushing, the self-locking being achieved via the thread-forming configuration.

6. The fastening assembly as recited in claim 1, wherein the bolt shank has a thread over at least a portion of the shank.

7. The fastening assembly as recited in claim 1, wherein the engagement surfaces have a form of one of an external toothing or an external polyhedron, wherein the shank of the bolt has a left-hand thread, and wherein the bolt has a coated thread, the self-locking being achieved via the coating.

8. The fastening assembly as recited in claim 7, wherein the bolt shank has a thread over at least a portion of the shank.

9. The fastening assembly as recited in claim 1, wherein the engagement surfaces have a form of one of an external toothing or an external polyhedron, wherein the shank of the bolt has a left-hand thread, and wherein the bolt has a thread configured to be thread-forming for a corresponding bushing, the self-locking being achieved via the thread-forming configuration.

10. The fastening assembly as recited in claim 9, wherein the bolt shank has a thread over at least a portion of the shank.

* * * * *

UNITED STATES PATENT AND TRADEMARK OFFICE
CERTIFICATE OF CORRECTION

PATENT NO. : 8,511,954 B2  Page 1 of 1
APPLICATION NO. : 10/524811
DATED : August 20, 2013
INVENTOR(S) : Fink et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Fifteenth Day of September, 2015

Michelle K. Lee
*Director of the United States Patent and Trademark Office*